United States Patent
Shouji

[19]

[11] Patent Number: 5,903,968
[45] Date of Patent: May 18, 1999

[54] MANUFACTURE OF MAGNETIC HEADS HAVING ASYMMETRIC AIR BEARING SURFACES

[75] Inventor: Shigeru Shouji, Hamamatsu, Japan

[73] Assignee: Yamaha Corporation, Japan

[21] Appl. No.: 08/409,733

[22] Filed: Mar. 23, 1995

[30] Foreign Application Priority Data

Mar. 24, 1994 [JP] Japan ..................................... 6-078216

[51] Int. Cl.$^6$ .................................................. G11B 5/127
[52] U.S. Cl. ..................................... 29/603.09; 29/603.12
[58] Field of Search ........................... 29/603.09, 603.12, 29/603.13, 603.14

[56] References Cited

U.S. PATENT DOCUMENTS

| | | |
|---|---|---|
| 4,333,229 | 6/1982 | Ellenberger .......................... 29/603.14 |
| 4,785,161 | 11/1988 | Strom . |
| 4,835,361 | 5/1989 | Strom . |
| 5,159,508 | 10/1992 | Grill et al. . |

FOREIGN PATENT DOCUMENTS

| | | |
|---|---|---|
| 4-364217 | 12/1992 | Japan . |
| 5-128461 | 5/1993 | Japan . |

*Primary Examiner*—P. W. Echols
*Attorney, Agent, or Firm*—Ostrolenk, Faber, Gerb & Soffen, LLP

[57] ABSTRACT

Thin film magnetic heads each having non-parallel asymmetric rails are manufactured by, forming a multiplicity of thin film magnetic transducers on a substrate, for a matrix distribution of magnetic heads to be produced from the substrate; testing all the magnetic transducers and discriminating them into good ones and failed ones; assigning a rail pattern to each of the magnetic heads, which pattern utilizes a good magnetic transducer; severing the substrate into respective rows; polishing an air bearing surface on each row; forming a resist layer on the air bearing surface of each row; positioning the rows in an exposing apparatus; exposing the assigned rail pattern on the resist layer in each magnetic head region of each row.

34 Claims, 14 Drawing Sheets

ION BEAM

MANUFACTURE OF MAGNETIC HEADS HAVING ASYMMETRIC AIR BEARING SURFACES

BACKGROUND OF THE INVENTION a) Field of the Invention

The present invention relates to a method of manufacturing a thin film magnetic head, and, more particularly, to a method of manufacturing an air flow type thin film magnetic head.

b) Description of the Related Art

A thin film magnetic head that performs recording and reproducing of information on and from a magnetic recording medium such as a hard disk includes thin film magnetic head transducers and a slider that mounts them. The slider has air bearing surfaces (ABS) that hold air flow in a space between the magnetic recording medium and ABS, and lift the slider from the medium. When the thin film magnetic head held by an arm is disposed on the surface of a rotating magnetic disk, an air flow sandwiched between the thin film magnetic disk and the disk lifts the thin film magnetic head. This type of head is called a magnetic head of the air flow type.

FIG. 6A shows a configuration of a prior art magnetic head of the air flow type. A magnetic head 10 includes a slider 12 and a pair of magnetic head transducers 18 and 20. Each transducer is formed of laminated lagons. On the lower surface of the slider 12, two ABSs 14 and 16 are formed. A region between the two ABSs 14 and 16 is removed to form a groove 30.

FIG. 6B is a schematic perspective view showing a state of the magnetic head in practical use. The magnetic head 10 is disposed above the rotating magnetic disk 22. Dragged by the rotating disk 22, air 13 on the surface of the magnetic disk starts to flow underneath the magnetic head 10. Front portion 16a of the ABS 16 of the slider 12 is inclined and is disposed in tapered relation to the rear portion 16b. The air flow 13 strikes the ABS 16 and glides into a portion underneath the surface. Here, similar air flow is produced underneath the other ABS 14. Thus the slider 12 is subjected to a force in the upward direction shown in the figure and, thereby, lifted from the surface of the magnetic disk. The thin film magnetic transducer 20 performs recording on and reproducing from the magnetic disk from a distance with an amount of lifting H.

FIGS. 7A through 7E shows an example of a method of manufacturing a magnetic head according to a prior art technique, as described above.

As shown in FIG. 7A, a multiplicity of thin film magnetic head transducers 22 are formed on a wafer 21 of ceramic materials such as $Al_2O_3$—TiC. Techniques utilized for the formation are thin film forming technique for manufacturing semiconductor devices, photolithography, patterning technique, and so on.

As shown in FIG. 7B, a multiplicity of grooves are formed on the wafer 21 formed with the multiplicity of thin film magnetic transducers 22. The grooves are cut in orthogonal relation to each other. The grooves prevent chipping that may occur during severing of the wafer 21. Here, a pair of thin film magnetic transducers is disposed on each chip, respectively.

As shown in FIG. 7C, the wafer 21 is severed along the transverse grooves 25 shown in the figure. Each of the severed stripe-shaped pieces of the wafer 21 is called a row 26.

As shown in FIG. 7D, one of the severed surfaces of each row 26 is polished to form an air bearing surface 28. Here, as shown in the figure, the thin film magnetic transducers 22 are formed on a surface perpendicular to the ABS 28.

Then, unnecessary portions of the ABS 28 are removed to form the recessed portions 30. As shown in FIG. 8, rotating blade 32 can be used to remove unnecessary portions 27 and leave the rails 14 and 16. Remaining portions form rails 14 and 16 each of them provided with an air bearing surface. Then, each row 26 is severed along vertical groove 24 to form thin film magnetic heads, as shown in FIG. 7E.

Each of the magnetic heads 10 is necessarily formed with two rails. However, each of the magnetic heads 10 needs one transducer. So, it is not indispensable to form two transducers for each head as shown in the figure. However, in practical use, the magnetic heads 10 are disposed on both sides of the magnetic disk. Thus, it is preferable that each magnetic head have a structure of mirror symmetry.

Consider the case of forming symmetrical rails 14 and 16 on a magnetic head and providing ABS on each of their surfaces as shown in FIG. 7E. Each of the magnetic heads can be used in either side of the magnetic recording medium by forming the thin film magnetic transducers 22 on the back portions of both rails.

The amount of lifting of a magnetic head having parallel rails depends upon relative speed of the head to the rotating magnetic disk. Normally, the amount of lifting increases as the relative speed increases. Consequently, the amount of lifting of the magnetic head depends on the position of the magnetic head with respect to the radial direction of the magnetic disk that is rotating in a fixed rotating speed.

Recently, a demand for a constant amount of lifting of the magnetic head regardless of the relative speed between the magnetic head and the magnetic disk has risen.

FIG. 9 shows an example of a structure of a magnetic head having asymmetrical and non-parallel rails as means for satisfying such demand.

Asymmetrical and non-parallel rails 34 and 36 are formed on the lower surface of the magnetic head 38. Magnetic head transducers 18 and 20 are formed on the back portion of each rail.

It is difficult to form such asymmetrical and non-parallel rails 34 and 36 by machining, as shown in FIG. 8. Therefore, magnetic head having the asymmetrical and non-parallel rails have, so far, been formed by photo-lithography utilizing a mask pattern.

FIGS. 10A through 10F show an example of prior art technique for manufacturing such asymmetrical and non-parallel rails.

As shown in FIG. 10A, rows 26 are formed. Process of forming the rows is similar to the process as shown in FIGS. 7A through 7C. After forming the rows 26, one of the severed side surfaces is polished to form an ABS 28.

As shown in FIG. 10B, the ABS 28 is coated with photoresist material for forming a resist film 40. Here, coating of photoresist material may be substituted by laminating a dry film.

As shown in FIG. 10C, a plurality of rows 26 are arranged in parallel and the resist film 40 is subjected to exposure of mask pattern through a photo mask 42. A multiplicity of asymmetrical and non-parallel rail patterns are formed on the photo mask 42. The exposure employs, for example, g-line light beam from mercury lamp, and is conducted simultaneously on a multiplicity of slider patterns. This process requires a complex alignment before exposure, and used to take, for example, 10 minutes for one exposure.

As shown in FIG. 10D, resist film on each row 26 is developed. Resist mask pattern 40a is formed thereby.

As shown in FIG. 10E, the ABS 28 of each row 26 is etched by the ion beam through the mask pattern 40a which serves as an etching mask. The portions of the surface of the row 26 not masked are etched to form recessed portions.

Thereafter, the mask pattern 40a is removed and each slider chip is severed from the row 26. Thus, a magnetic head 38 having asymmetrical and non-parallel rails 34 and 36, as shown in FIG. 10F, is formed.

The use of a magnetic head thus formed is determined by the shapes of ABSs on the rails. Namely, denoting both sides of a magnetic disk with which the magnetic head is to be used as side A and side B, the use of the head on side A or side B is preliminarily determined according to the pattern of the rail.

In a magnetic head used on side A of the magnetic disk, the magnetic head fails when one of the magnetic transducers to be used as the side A transducer is not good. In this case, even when the other magnetic transducer to be used as the side B transducer is good, the head is still considered failed, since the pattern of the rails is predetermined to be used on side A.

In the case of parallel rail pattern, as shown in FIG. 6A, one of the magnetic transducers can substitute for the other magnetic transducer that is failed. In the case of asymmetrical and non-parallel rail patterns, it is impossible to substitute in the event of failure of one of the transducers because the design predetermines which side, i.e. outer or inner side, of transducers is used on the magnetic disk.

SUMMARY OF THE INVENTION

An object of the present invention is to provide a method of effectively manufacturing a magnetic head having asymmetrical and non parallel rail patterns capable of improving production yield.

According to an aspect of the present invention, there is provided a method of manufacturing a thin film magnetic head comprising the steps of (a) forming plural sets of thin film magnetic transducers on a common plate, each of the sets of thin film magnetic transducers including a plurality of thin film magnetic transducers to be provided in one magnetic head; (b) testing each of the magnetic transducers and discriminating good or failed; (c) forming a photo-sensitive film on the common plate; and (d) projecting an assigned rail pattern on each region of the photo-sensitive film adapted for utilizing a good magnetic transducer in each magnetic head.

Because each exposure is a fraction of a second the total exposure time is reduced.

By allowing selection of an arbitrary pattern among a plurality of rail patterns for each magnetic head, the thin film magnetic head can be formed using a good thin film magnetic transducer. Thus as long as there is one good thin film magnetic transducer among a plurality of transducers formed for one thin film magnetic head, it becomes possible to manufacture a thin film magnetic head.

DESCRIPTION OF THE PREFERRED EMBODIMENTS

Figure 1:
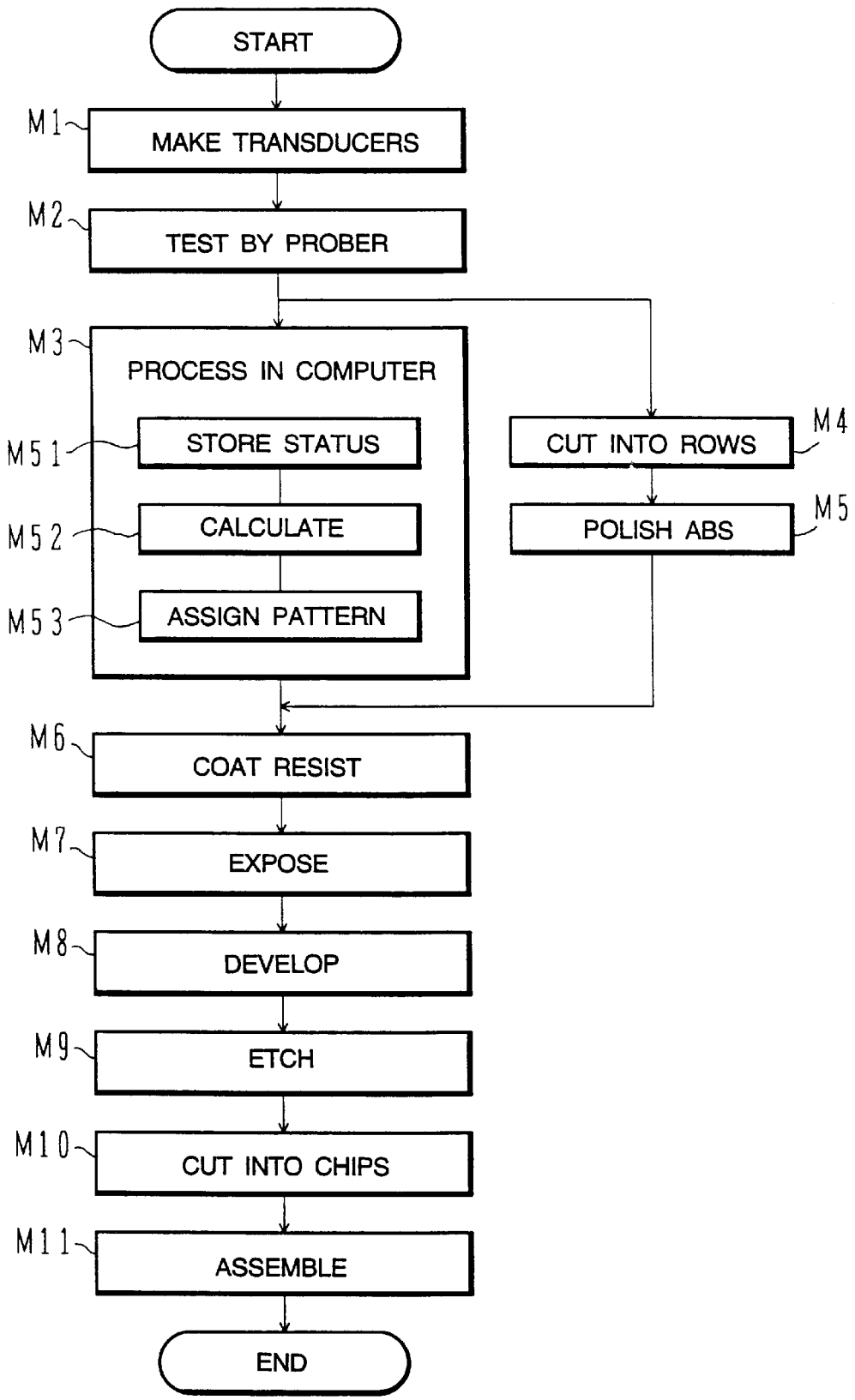
FIG. 1 is a flow chart showing the process of manufacturing a thin film magnetic head according to an embodiment of the present invention.

In reproducing information from a magnetic recording medium, the arm portion that holds a thin film magnetic head on its end moves rotatively on an axis of rotation different from the axis of rotation of the recording medium. The rotary motion of the arm, though following approximately the radial direction of the recording medium, does not coincide with the radial direction.

An air flow is present between the recording medium and the magnetic head. Sliders of the magnetic head are lifted up from the recording medium due to the air flow. Tangential speed of the rotating recording medium varies with the position of the recording medium in radial direction. Accordingly, speed of the air flow formed on the recording medium varies with the position in radial direction. With a shape of slider rails of a magnetic head symmetrical with respect to center line of the slider, amount of lifting of the slider varies depending upon the speed of air flow. The amount of lifting of the slider with respect to radial direction can be stabilized by employing a structure wherein shapes of rails are asymmetrical with reference to center line of the slider.

For recording on and reproducing from both sides of a single magnetic disk, thin film magnetic heads are disposed on both sides of each disk. Accordingly, it is preferable that a pair of thin film magnetic heads have a mirror symmetrical structure having a plane of symmetry on the surface of the medium. In the case of a slider having a parallel rail structure, rails with two transducers on a single magnetic head is formed and the magnetic head has been applicable to both A side and B side. In practical use, one of the two transducers is selected to be a constituent of a magnetic head.

However, with rails having asymmetrical shapes, rail structures of a pair of mirror symmetrical magnetic heads have different shapes. For example, consider the case when a transducer disposed on the outer portion with respect to radial direction of the magnetic disk is employed. Though each magnetic head has two thin film magnetic transducers formed thereon, the magnetic transducer to be used is designated by the rail structure formed on the head. When the transducer to be used is a failed one, the head itself becomes a failed magnetic head as a head that uses the outer transducer. For forming a magnetic head assembly using a good one of the transducers, it is necessary to prepare a pair of magnetic heads using inner transducers having patterns of mirror symmetry, and manufacture a magnetic head assembly that uses inner transducers.

The inventor proposes to test transducers of each magnetic head before processing rails, and to manufacture a magnetic head using a good one of the transducers when at least one of the transducers is good.

Usually, rail processing of the slider of a magnetic head utilizes photolithography using a mask or a reticle. By this process, rail patterns are selected for each magnetic head according to the result of test on the transducers. Thus, production yield can be improved by manufacturing each magnetic head using good transducer.

Hereunder, referring to the figures, embodiments of the present invention will be described.

Figure 2A:
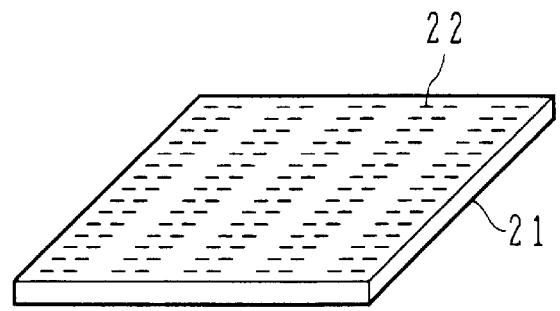
FIGS. 2A through 2F are schematic perspective views illustrating main steps of the process of manufacturing a thin film magnetic head shown in FIG. 1.
Figure 9:
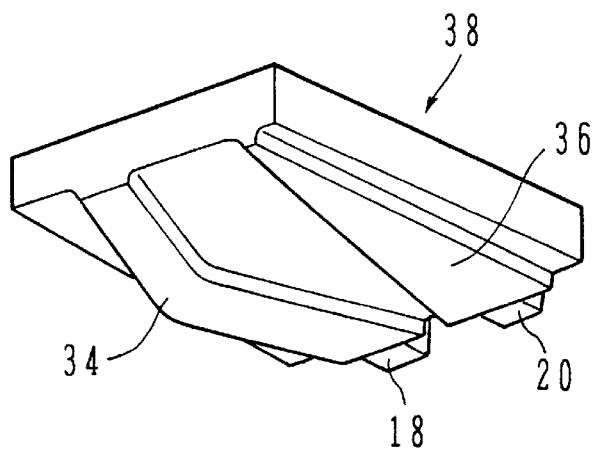
FIG. 9 is a perspective view showing an example of a thin film magnetic head having an asymmetrical and non-parallel rail structure according to prior art technique.
Figure 10A:
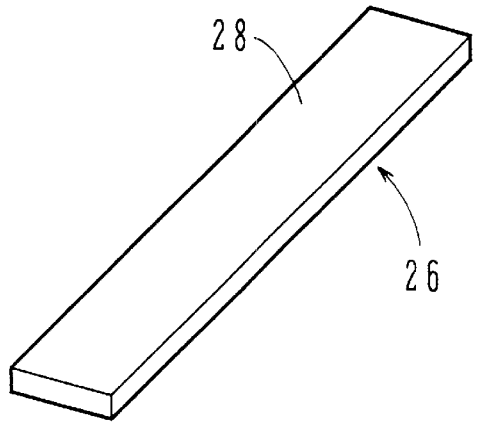
FIGS. 10A through 10F are schematic perspective views illustrating main steps of the process of manufacturing a thin film magnetic head having non-parallel rails according to prior art technique.
Figure 10B:
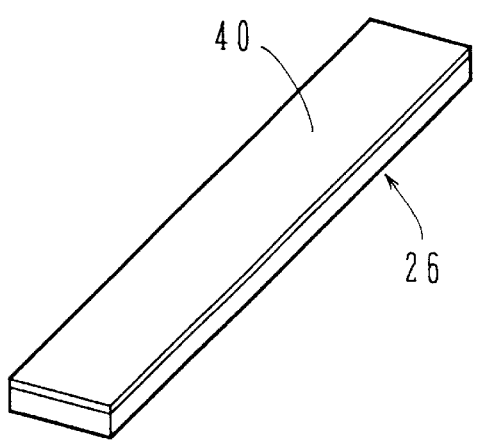
Figure 10C:
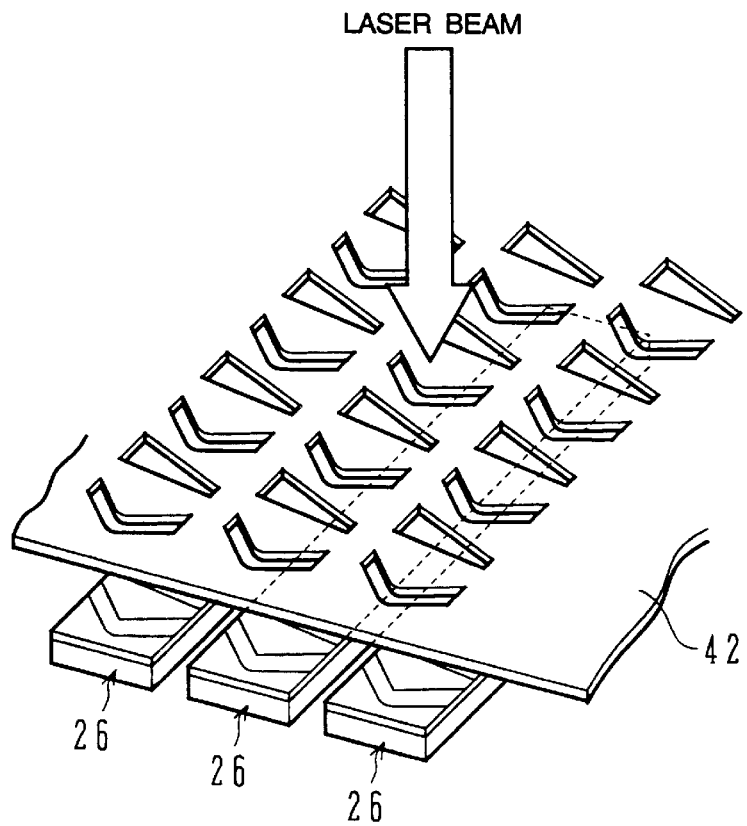
Figure 10D:
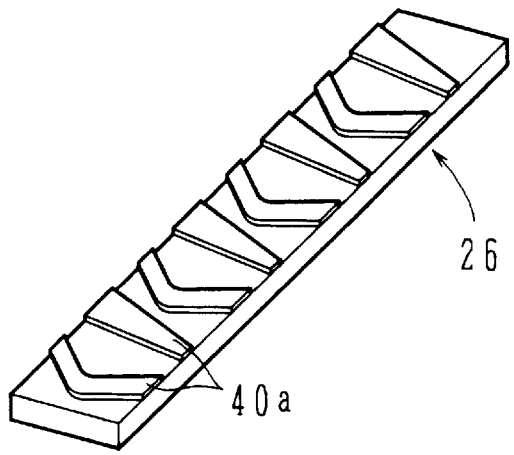
Figure 10E:
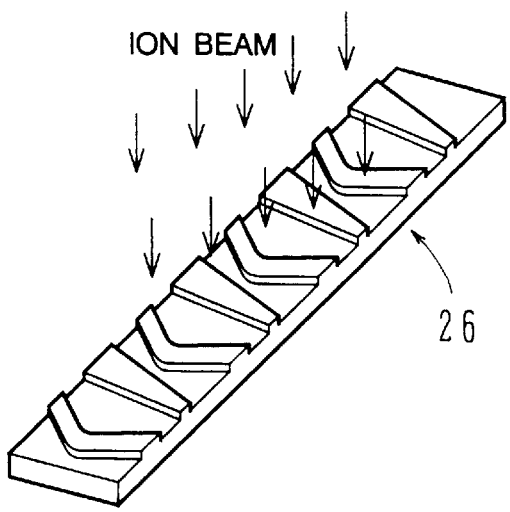
Figure 10F:
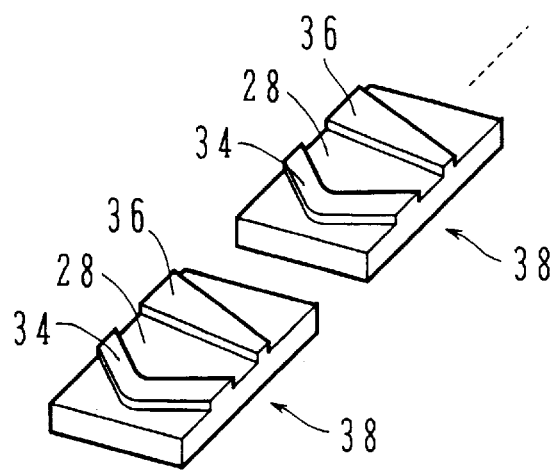

FIG. 1 is a flow chart showing main steps of an embodiment of the present invention. Upon initiating the manufacture of magnetic head, in step M1, transducers are formed. Transducers are formed, as shown in FIG. 2A, on a ceramic wafer 21 of such materials as $Al_2O_3$—TiC. On the ceramic wafer, a layer, preferably, of aluminum oxide (alumina) is formed, and, thereon, a multiplicity of thin film magnetic transducers 22 is formed using such semiconductor device manufacturing techniques as photolithography, thin film formation technique, etching technique, etc. These transducers 22 are disposed in such manner that one magnetic head includes two transducers when the wafer is severed for forming each magnetic head. Thin film transducers are formed to be able to manufacture, for example, a thin film magnetic head, as shown in FIG. 9.

Here, each transducer, preferably, has a known structure that is a laminate of a magnetoresistive reproducing transducer and a magnetic induction type recording transducer. Further, the wafer can be formed of any non-magnetic material that gives a physical support, and may be formed of other ceramic material than $Al_2O_3$—TiC, or of non-magnetic semiconductor material.

Next, in step M2 in FIG. 1, all the thin film magnetic transducers 22 on the wafer are tested using a prober.

In the next step M3, the result of the test is processed in a computer. The processing in the computer includes step M51 for storing status of each thin film magnetic transducer, step M52 for a calculation for the sake of manufacturing a desired number of multiple sorts of thin film magnetic transducers using good thin film magnetic transducers, and step M53 for assigning rail pattern for each magnetic head according to the number of thin film magnetic transducers to be manufactured for each sort. Thus, each pair among the multiplicity of pairs of thin film magnetic transducers for a magnetic head formed on the wafer 21 is assigned by what sort of thin film magnetic head is manufactured by the pair.

Hereunder, the case in which two thin film magnetic transducers are formed on one magnetic head and are manufactured into two sorts of magnetic heads is described. Each magnetic head has thin film magnetic transducers on its right side and left side. Whether right side transducer is used or left side transducer is used is determined according to the status of the head. The result of the test gives information for each magnetic head on whether only the right side transducer is good, whether only the left side transducer is good, whether both the left and right side transducers are good, or whether both the left and right side transducers are failed. This information is stored in status memory in step M51. The status memory can store information for respective wafers, for respective rows, or the like. This unit set of status memory is called a lot.

Conventionally, nearly half of the heads having only one good transducer on the right side or left side used to be treated as failed, because they used to be inapplicable as asymmetrical sliders. There is no way to reclaim the heads with transducers failed on both right and left sides. But essentially all of those heads each having only one good transducer are completed as heads capable of use.

In operation step M52, the sliders are discriminated to those for the right side and for the left side. The ratio, within a lot, of the magnetic heads in which the right side transducer is used and of the magnetic heads in which the left side transducer is used fits a desired value. In other words, magnetic heads in which the right side transducer is discriminated as those for the right side, magnetic heads in which the left side transducer is good is discriminated as those for the left side. Magnetic heads in which both the right and left side transducers are good are discriminated as either those for the right side or those for the left side so that the ratio, for one lot, between the magnetic heads for the right side and the magnetic heads for the left side satisfies a desired ratio.

For example, it is assumed that the total number of sliders in one lot in which at least one left or right side transducer is good is denoted by N and that the number of sliders in which only the right side transducer is good is denoted by a and the number of sliders in which only the left side transducer is good is denoted by b. The number of sliders in which both the left and right side transducers are good becomes N−(a+b). Half the number of sliders in which at least one side of transducer is good is N÷2. Accordingly, among the sliders in which both the left and right side elements are good, N÷2−a is used for the right side and N÷2−b is used for the right side. When N is an odd number, the number of sliders for either the right side or the left side is increased by one. By distributing in this way, the numbers of magnetic heads for the right side and of magnetic heads for the left side becomes almost equal, and best production yield can be obtained. Step M53 for assigning patterns assigns rail shape of the sliders for each row 26 to conform the above described result of discrimination and stores in an arrangement state memory.

On the other hand, the wafer 21 which was subjected to a prober test, in step M4, is severed into rows.

Figure 2B:
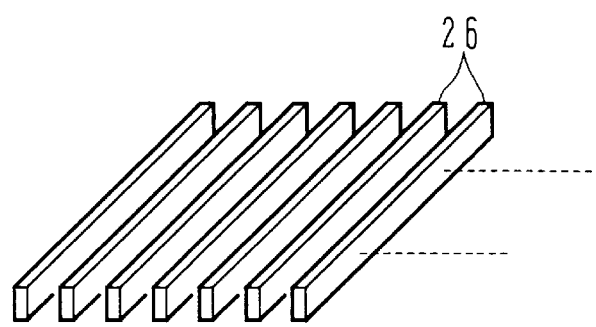

FIG. 2B shows the state in which the wafer 21 is severed into plurality of rows 26.

Figure 2C:
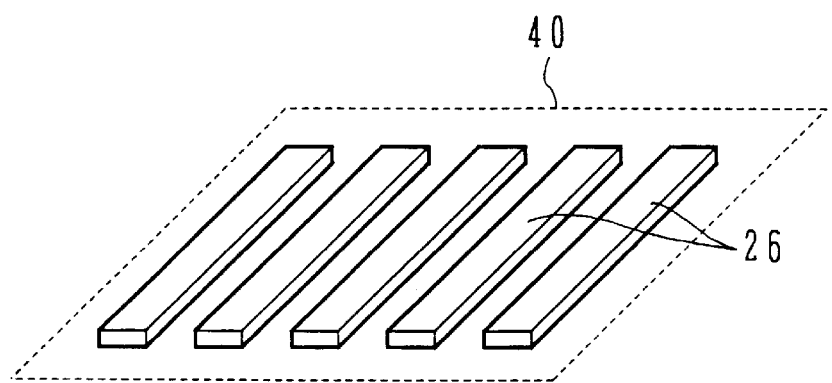

In step M5, one severed surfaces of each severed row is polished (or lapped) for forming an air bearing surface ABS. As shown in FIG. 2C, ABS is one of the severed surfaces of each row as severed in FIG. 2B. ABS can be formed by polishing the plurality of rows fixed on a jig in a single process.

In step M6, each row 26 is coated by photoresist layer on the surface thereof. Dry film 40, as shown in FIG. 2C, may be attached instead of photoresist. Photo sensitive film which can either be a photoresist or a dry film is represented, hereunder, by numeral 40.

In step M7 for developing, each row is exposed according to the arrangement of the assigned pattern in step M53.

Figure 2D:
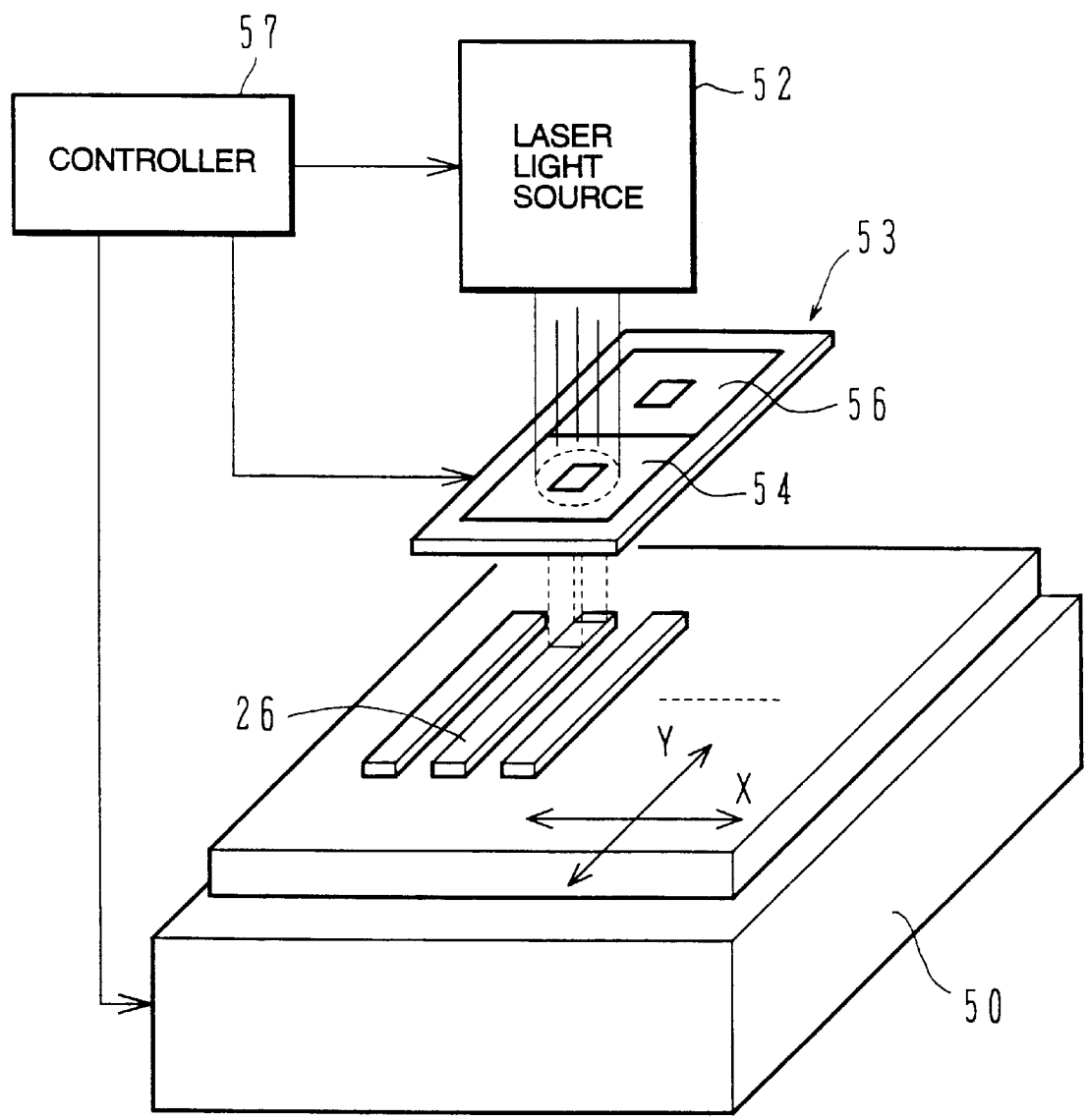

As shown in FIG. 2D, a plurality of rows 26 is set on the upper surface of an XY stage 50 of an exposure device with the photo sensitive film facing upward. The exposure device is a stepper, for example, used for manufacturing semiconductor devices. For convenience sake, the longitudinal direction of the rows will be called as Y direction and the direction of their arrangement will be called as X direction. Above the XY stage 50 of the exposure device, a mask or reticle 53 that includes a mask 54 with a pattern for the right side rail and a mask 56 with a pattern for the left side rail is disposed. Control signal from a controller 57 gives the information as to which of the two masks 54 and 56 should be employed and moves the mask 53.

A laser light source 52 is disposed above the mask 53. The controller 57 controls the switching on and off of the laser light source. The controller 57 also controls the position of the XY stage 50.

Laser light generated out of the laser light source 52 passes through one of the mask regions of the mask 53, and irradiates a pattern of the mask on one of magnetic head regions on the row 26. Upon completion of exposure of one magnetic head, the XY stage moves for setting the next magnetic head region for exposure.

Figure 3A:
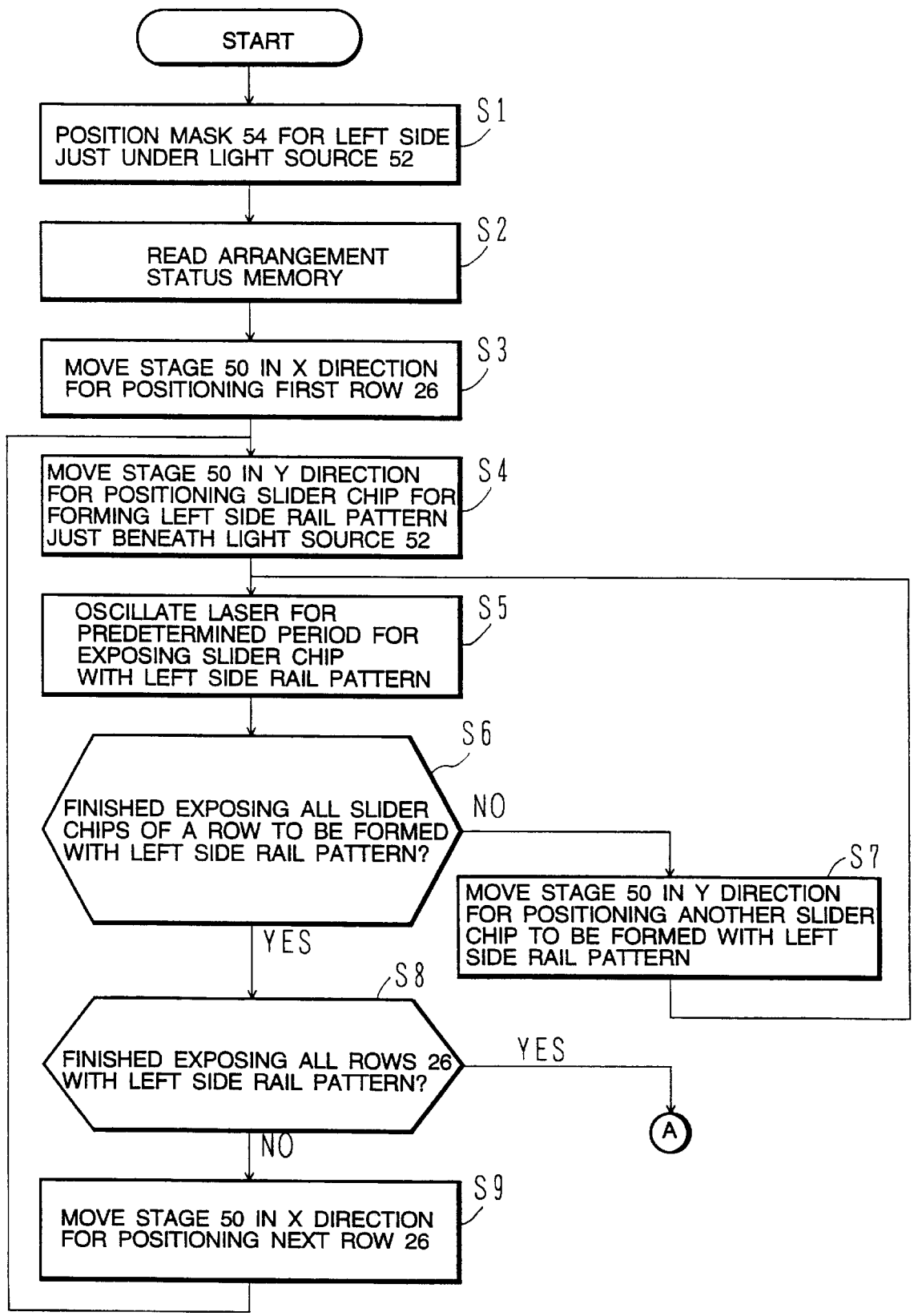
FIGS. 3A and 3B are flow charts showing in detail an embodiment of exposing step M7 in the flow chart shown in FIG. 1.
Figure 3B:
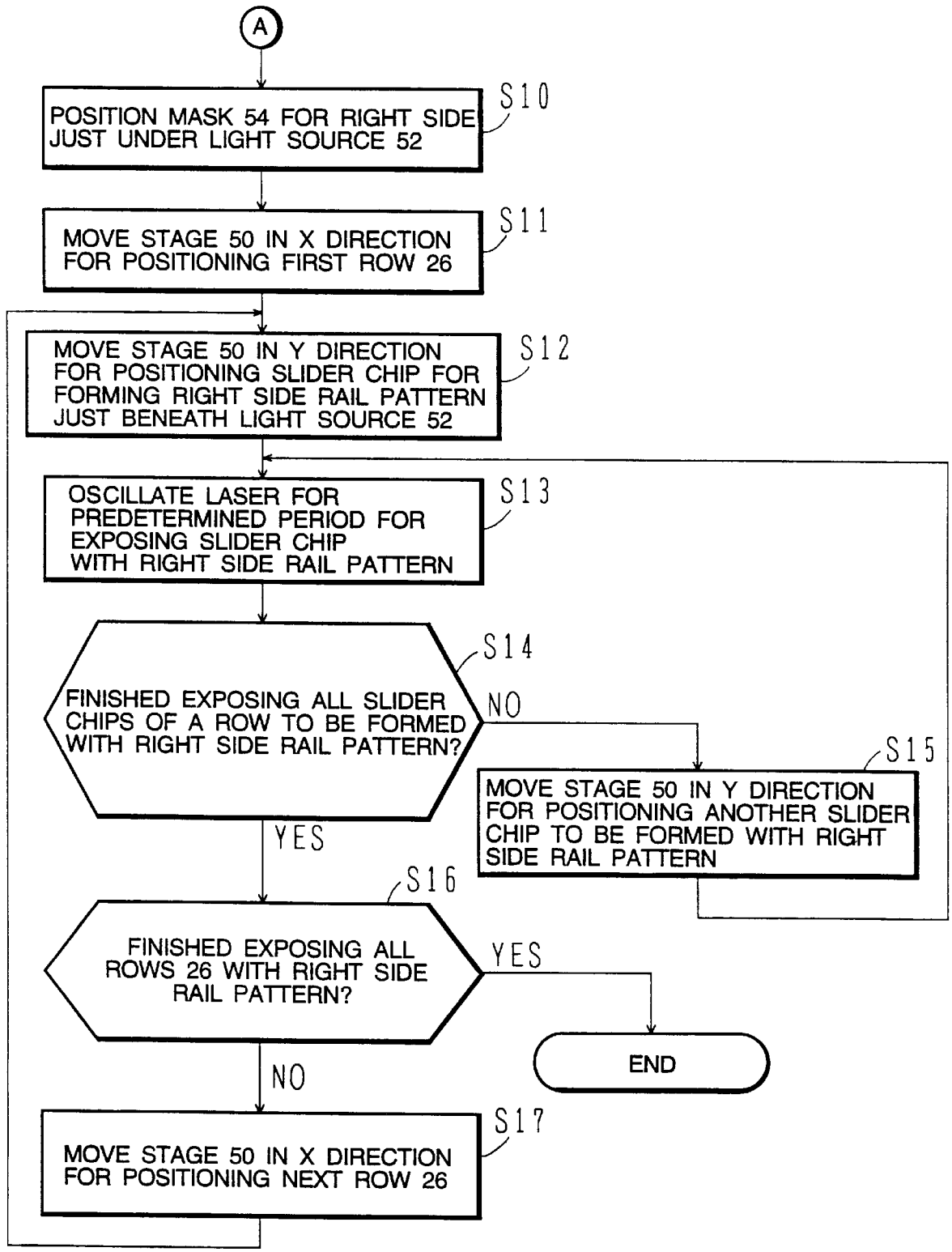

FIGS. 3A and 3B are flow charts describing an embodiment of exposure steps in detail. In step S1, the left side mask 54 is positioned just beneath the light source 52. In the next step S2, the position of the magnetic head to be exposed with the left side mask is read from the arrangement state memory.

In step S3, the stage 50 is moved in the X direction to position the first row 26 beneath the light source. Then, in step S4, the stage 50 is moved in the Y direction for positioning the slider chip to be formed with left side rail pattern just beneath the light source 52. In step S5, the laser light source oscillates for a predetermined period of time and exposes the left side rail pattern on the slider chip thus positioned in place. After finishing the exposure, in step S6, whether all of the slider chips on the row to be formed with left side rail pattern are exposed or not is judged. If all of the slider chips on the row to be exposed with left side rail pattern are not finished to be exposed, the process goes into step S7 following an arrow with NO. In this step S7, the stage 50 moves in the Y direction for positioning the next slider chip to be formed with left side rail pattern beneath the light source. After positioning, in step S5, the positioned slider chip is exposed. Cycles of steps S5, S6, and S7 are repeated until all the assigned left side rail patterns for the row are completed. When the row is finished with exposing all the left side rail patterns in step S6, following the arrow with YES, the flow goes to step S8. In step S8, whether all of the rows 26 has finished with exposure of left side rail pattern is judged. If all the exposures are not finished, following an arrow with NO to step S9, the stage 50 moves in the X direction for positioning the next row 26. Processes from step S4 is repeated to the new row 26.

In step S8, when it is judged that all the rows have been subjected to exposure of left side rail pattern, following an arrow with YES, the process goes in to step S10 shown in FIG. 3B.

In step S10, the right side mask 54 is positioned just beneath the light source 52. Namely, in the next steps, right side rail patterns are exposed. Arrangement state memory reproduces slider chips to be exposed with right side rail pattern.

In step S11, the stage 50 is moved in the X direction to position the first row 26 beneath the light source. In the next step S12, the stage 50 is moved in the Y direction for positioning the slider chip to be formed with right side rail pattern just beneath the light source 52. In step S13, the laser light source oscillates for a predetermined period of time and exposes the right side rail pattern on the slider chip thus positioned in place.

Then, in step S14, whether all of the slider chips on the row to be formed with right side rail pattern are exposed or not is judged. If all of the slider chips on the row to be exposed with right side rail pattern are not finished being exposed, the process goes into step S15 following an arrow with NO. In this step S15, the stage 50 moves in the Y direction for positioning the next slider chip to be formed with right side rail pattern beneath the light source. After positioning, returning to step S13, the positioned slider chip is exposed. In this way, cycles of steps S13, S14, and S15 are repeated until all the assigned right side rail patterns for the row is completed. When the row is finished with exposure of all the right side rail patterns in step S14, following the arrow with YES, the process enters into step S16. In step S16, whether all of the rows 26 has finished exposure of right side rail pattern is judged. If all the exposures are not finished, following an arrow with NO to step S17, the stage 50 moves in the X direction for positioning the next row 26. Processes from step S12 is repeated to the next row 26. When it is judged that all the rows have been subjected to exposures of right side rail pattern at step S16, the process closes following an arrow with YES.

The exposure time depends on resist material, intensity of exposing light, etc. In the case of excimer laser, the exposure time is of the order, for example, of one several tenth seconds. Slider chips in which both transducers are failed ones are not subjected to exposure. Waste in exposure time is prevented.

Rows 26 completed with exposure are taken off from the XY stage 50. Then, in step M8, the photosensitive mask is developed by dipping in developing solution etc.

Figure 2E:
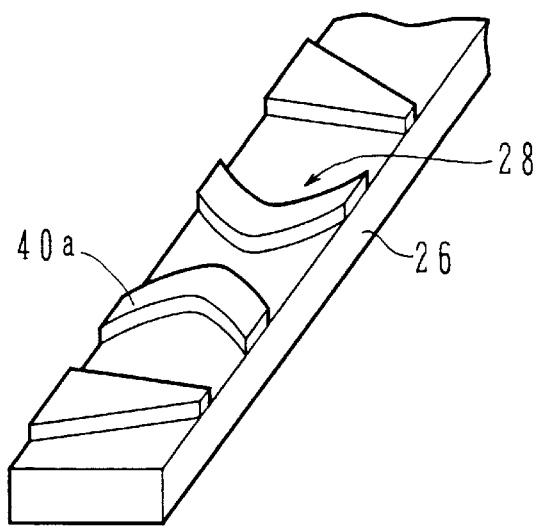

FIG. 2E shows schematically shapes of resist pattern 40a left on the row 26 after developing. In step M9, exposed surface of ABS 28 on the row 26 that is not covered with the resist pattern 40a is etched by such method as ion beam etching, powder blast, reactive etching, etc., with the resist pattern 40a as a mask. Thus, the portion of the ABS other than the portion of rail is engraved. As a result, the rail is left on the row.

Figure 2F:
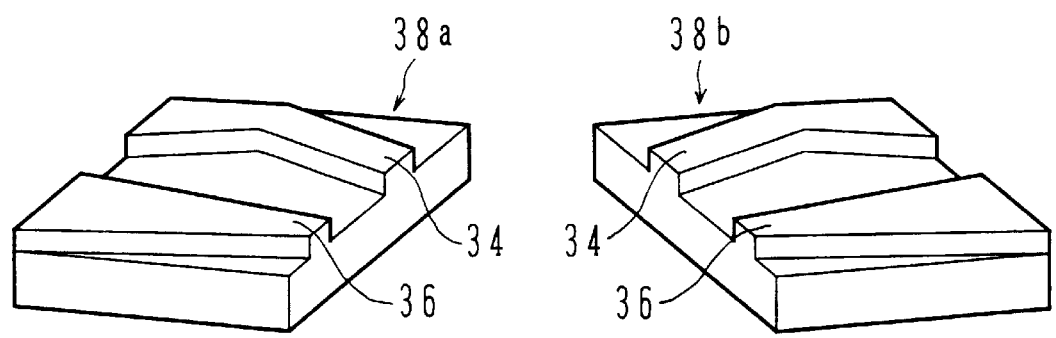

Then, removing the resist pattern 40a, magnetic heads having rails as shown in FIG. 2F are obtained. For example, magnetic head 38a shows a magnetic head for right side, and magnetic head 38b shows a magnetic head for left side. In these magnetic heads, rails 34 and rails 36 have shapes of mirror symmetry, respectively.

In the embodiment described above, such order of exposure is shown that one of the mask for right side or for left side is first disposed for exposures on a plurality of exposing regions, and then the other of the mask is disposed for exposures on the rest of the regions. However, the order of exposure is not limited to the one described above.

Figure 4:
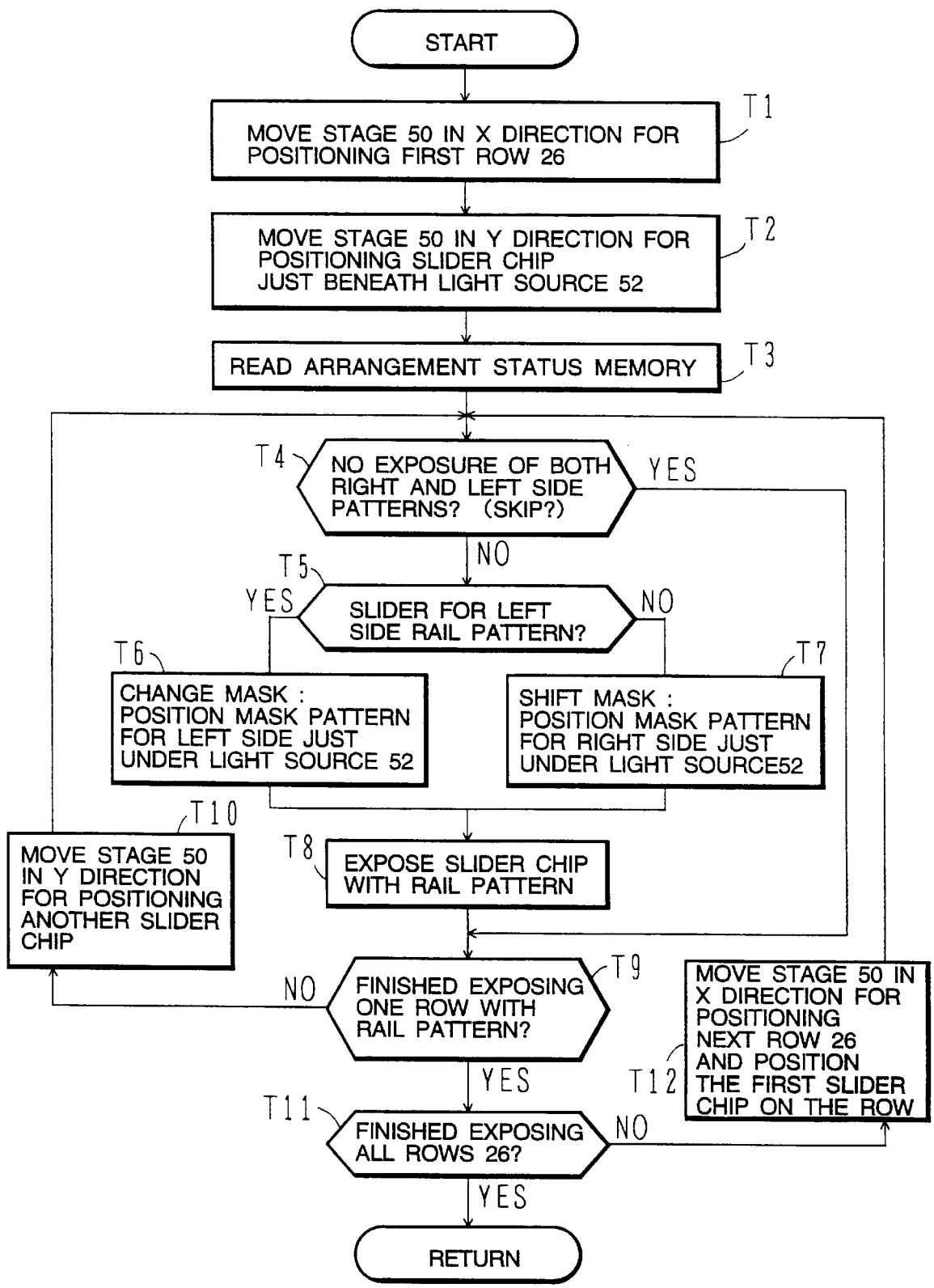
FIG. 4 is a flow chart showing in detail another embodiment of exposing step M7 in the flow chart shown in FIG. 1.

FIG. 4 is a flow chart to show another method of exposure. In step T1, the stage 50 is moved in the X direction to position the first row 26 beneath the light source. Then, in step T2, the stage 50 is moved in the Y direction for positioning the first slider chip just beneath the light source 52.

When the positioning of the slider chip is done, in step T3, arrangement state memory is reproduced to read exposure condition assigned for the slider.

In step T4, judgement is given on whether the slider is a failed one having no need to expose either right side or left side pattern or not. When the slider is a good one, entering into step T5 after an arrow of NO, judgement is given on whether it is a slider for left side rail pattern. When it requires a left side rail pattern, entering into step T6 after an arrow of YES, the mask of left side rail pattern is positioned just beneath the light source 56. When it does not require a left side rail pattern, i.e. requires a right side rail pattern, entering into step T7 after an arrow of NO, the mask of right side rail pattern is positioned just beneath the light source 56. Here, if appropriate mask has already positioned, these steps can be skipped.

In step T8, the positioned slider chip is exposed with an appropriate rail pattern. Here, when the slider is judged to be failed, these steps are by-passed.

Further, positioning may be conducted on those slider chips that is assigned to be exposed by reading the arrangement state memory beforehand.

In step T9, whether the row has completed exposure of rail patterns or not is judged. If the row has not finished with exposures, entering into step T10 after an arrow with NO, the stage 50 is moved in the Y direction to position the next slider chip. Then, the process comes back to step T4. The steps following step T4 are repeated until exposures of slider chips for each row is completed. When the row is finished with exposures, the process goes on from step T9 to step T11 after an arrow with YES, for a judgement on whether all the rows have completed with exposure. If all the rows are not finished with exposure, entering into step T12 after an arrow with NO, the stage moves in the X direction for positioning another row. Starting from the first slider chip on the positioned row, the process following the step T4 is repeated.

When, in step T11, all the rows are judged to have been completed with exposures, the exposure process finishes.

Here, description has been given for an exposing process in which there are two sorts of exposure patterns. However, types of exposure patterns are not limited to two. For example, exposure process using a plurality of sorts of exposure patterns with pairs on the right and left side can be employed.

Figure 5A:
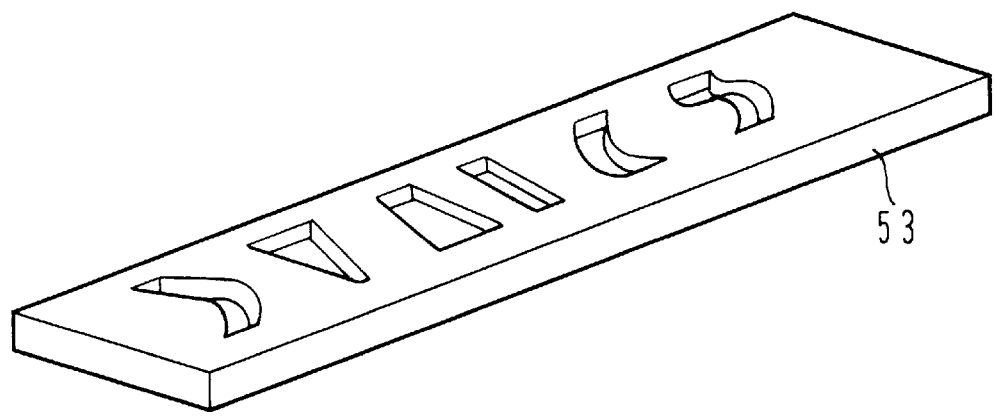
FIGS. 5A and 5B are perspective views showing examples of a mask and a magnetic head having a multiplicity of rail patterns applicable to an embodiment of the present invention.

FIG. 5A shows an example of mask configuration having a plurality of sorts of patterns. In the figure, three sorts of rail patterns are shown. In practice, sorts of rail patterns more in number are formed. Further, a mask having a plurality of same type of mask pattern can be configurated. For example, when a mask having two types for right side and left side is employed, at least four sets of combination is formed on a mask if consecutive two sliders are to be exposed in the same process. By exposing plurality of slider chips simultaneously, the number of exposure reduces.

Figure 5B:
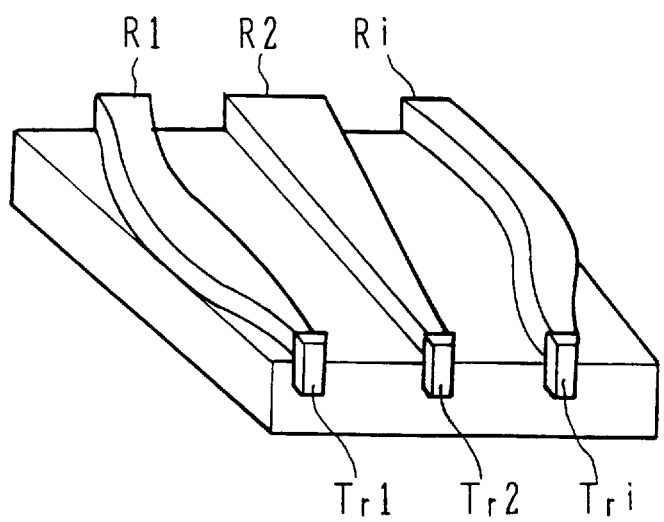
Figure 6A:
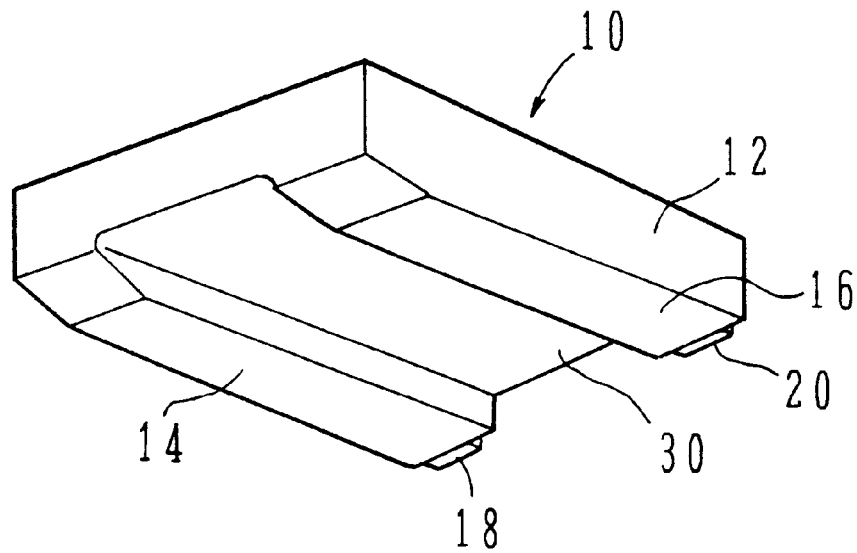
FIGS. 6A and 6B are a schematic perspective view and a side view showing a structure and a method of utilization of a magnetic head having parallel rails according to prior art technique.
Figure 6B:
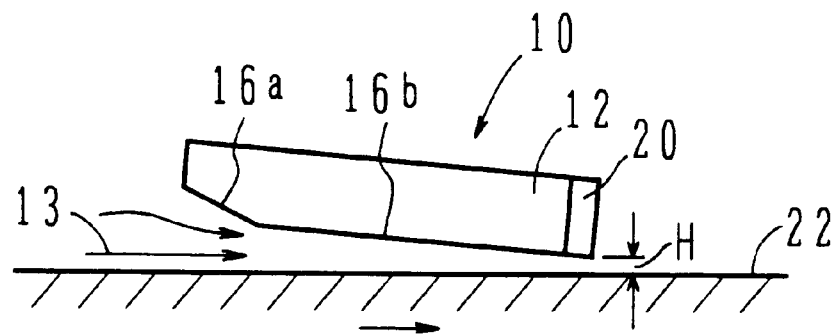
Figure 7A:
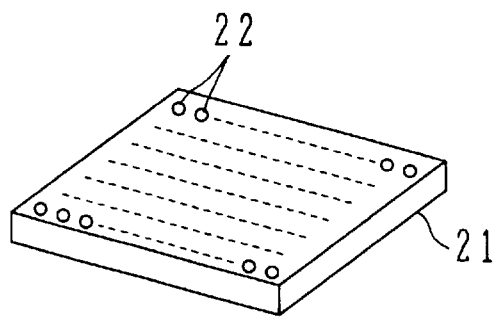
FIGS. 7A through 7E are schematic perspective views illustrating main steps of the process of manufacturing a thin film magnetic head according to prior art technique.
Figure 7B:
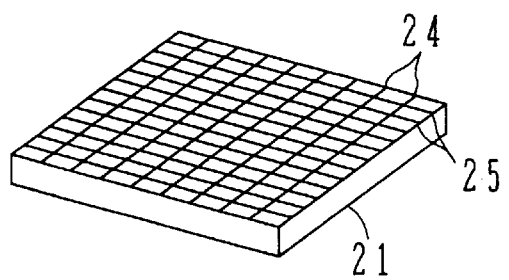
Figure 7C:
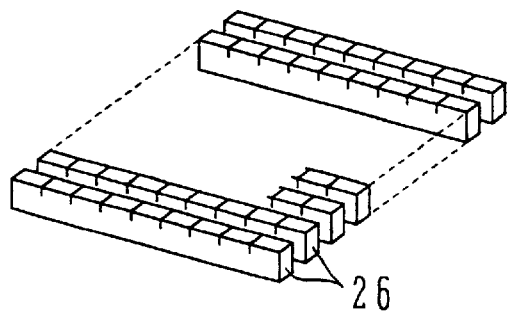
Figure 7D:
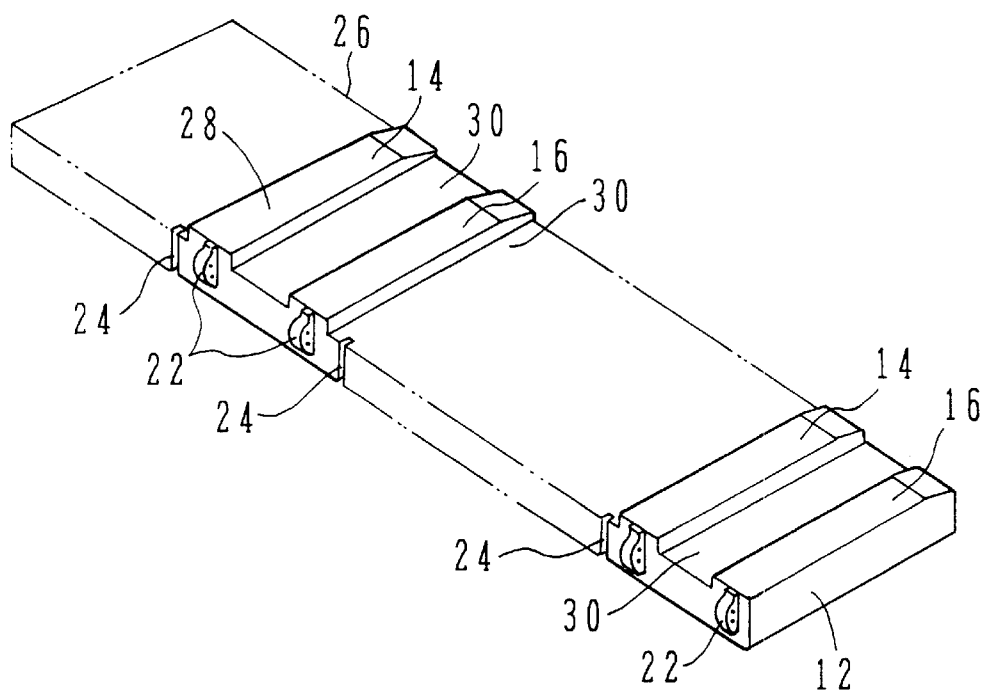
Figure 7E:
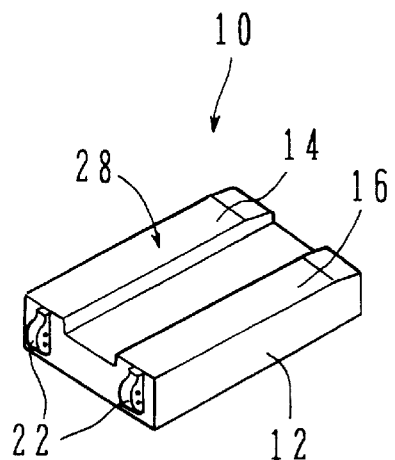
Figure 8:
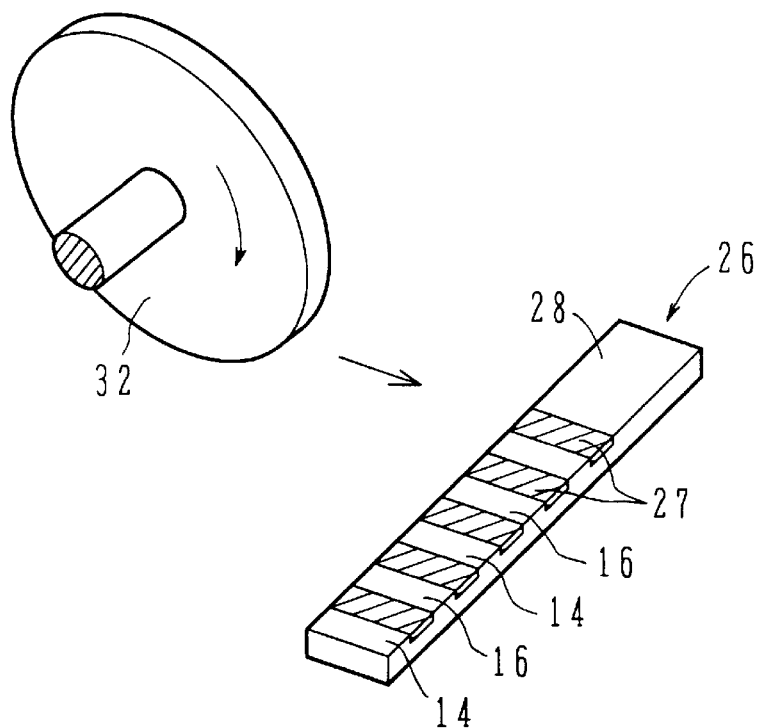
FIG. 8 is a schematic perspective view illustrating an abrading method employed in a step shown in FIG. 7D.

The number of rails and transducers are not limited to two. As shown in FIG. 5B, a magnetic head having three or more rails R1, R2, Ri, and three or more transducers Tr1, Tr2, Tri may be manufactured. Magnetic head having parallel rail, as shown in FIG. 7E, may be manufactured in a similar manner as described above.

The present invention has been described above in relation to preferred embodiments. The present invention is not limited to what has been described in embodiments. For example, exposure step can be conducted with various types of light source, other than that using excimer laser, such as electron beam, ion beam, etc. In the present specification, beam sensitive film is called to be a photoresist also when other beam than light beam is employed. It will be apparent to those skilled in the art that various changes, substitutes, combinations and improvements can be made within the scope and spirit of the appended claims.

I claim:

1. A method for manufacturing a magnetic head assembly having a magnetic transducer and a slider, comprising the steps of:
   (a) forming a plurality of magnetic transducers on a substrate;
   (b) testing each of said magnetic transducers to determine which transducers are good and which are failed;
   (c) severing a substrate into a plurality of rows each having a plurality of slider portions each to be formed into the slider, each of the slider portions having an air bearing surface;
   (d) selecting a first row from the plurality of rows;
   (e) selectively forming first patterns on the air bearing surfaces of a plurality of slider portions of the first row;
   (f) selectively forming second patterns on the air bearing surfaces of each of the plurality of slider portions of the first row;
   (g) selecting a second row from the plurality of rows;
   (h) selectively forming first patterns on the air bearing surfaces of a plurality of slider portions of the second row;
   (i) selectively forming second patterns on the air bearing surfaces of each of the plurality of slider portions of the second row; and
   (j) determining the first and second patterns based on the results of the testing.

2. A method according to claims 1, further comprising the steps of:
   (k) following the step (j), selecting one row from remaining rows:
       (l) selectively forming first patterns on said one row on the air bearing surface of a plurality of slider portions of said one row; and
       (m) repeating the steps (k) and (l).

3. A method according to claim 1, wherein the first patterns are formed on a first side of the air bearing surface.

4. A method according to claim 1, wherein the step (e) comprises the steps of:
   (e-1) selecting a first mask from a plurality of masks;
   (e-2) forming mask patterns on the air bearing surface of the slider portions of the first row through the first mask; and
   (e-3) milling the air bearing surface of the first row through the mask patterns to form the first patterns.

5. A method according to claim 4, wherein the step (e-3) is performed with laser beam.

6. A method according to claim 4, wherein the step (h) comprises the steps of:
   (h-1) forming mask patterns on the air bearing surface of the slider portions of the second row through the second mask; and
   (h-2) milling the air bearing surface of the second row through the mask patterns to form the type elements.

7. A method according to claim 4, wherein the step (f) comprises the steps of:
   (f-1) selecting a second mask different from the first mask from a plurality of masks;
   (f-2) forming mask patterns on the air bearing surface of the slider portions of the first row through the second mask; and (f-3) milling the air bearing surface of the first row through the mask pattern to form the second patterns.

8. A method according to claim 7, wherein the step (g-3) is performed with laser beam.

9. A method according to claim 7, wherein the step (i) comprises the steps of:
(i-1) forming mask patterns on the air bearing surface of the slider portions of the second row through the second mask; and
(i-2) milling the air bearing surface of the second row through the mask patterns to form the second type elements.

10. A method according to claim 1, further comprising the steps of:
(k) following the step (i), selecting one row from remaining rows;
(l) selectively forming second patterns on said one row on the air bearing surface of a plurality of slider portions of said one row; and
(m) repeating the steps (k) and (l).

11. A method according to claim 10, wherein the second patterns are formed on a second side of the slider portions.

12. A method according to claim 1, wherein the substrate comprises $Al_2O_3$—TiC.

13. A method according to claim 1, wherein the first and second patterns are substantially the same.

14. A method according to claim 1, wherein the first and second patterns are different.

15. A method according to claim 1, wherein the first and second patterns are asymmetric with respect to a center line of each slider portion.

16. A method for manufacturing a magnetic head assembly having a magnetic transducer and a slider, comprising the steps of:
(a) forming a plurality of magnetic transducers on a substrate formed in a row shape having a plurality of slider portions each to be formed into the slider, each of the slider portions having an air bearing surface (ABS);
(b) testing each of said magnetic transducers to determine which transducers are good and which are failed;
(c) selecting a first slider portion from the plurality of slider portions;
(d) forming a first pattern on the air bearing surface of the first slider portion;
(e) forming a second pattern on the air bearing surface of the first slider portion;
(f) selecting a second slider portion from the plurality of slider portions;
(g) forming a first pattern on the air bearing surface of the second slider portion;
(h) forming a second pattern on the air bearing surface of the second slider portion; and
(i) determining the first and second patterns based on the results of the testing.

17. A method according to claim 16, further comprising the steps of:
(j) following the step (i), selecting one slider portion from remaining slider portions;
(k) forming a first pattern on the air bearing surface of said one slider portion; and
(m) repeating the steps (j) and (k).

18. A method according to claim 17, further comprising the step of:
(n) after step (m), forming a second pattern on the air bearing surface of each of said one slider portions.

19. A method according to claim 16, wherein the first type pattern is formed on a first side of the air bearing surface.

20. A method according to claim 16, wherein the step (d) comprises the steps of:
(d-1) selecting a first mask from a plurality of masks;
(d-2) forming a mask pattern on the air bearing surface of the first slider portion through the first mask; and
(d-3) milling the air bearing surface through the mask pattern to form the first pattern.

21. A method according to claim 20, wherein the step (d-3) is performed with laser beam.

22. A method according to claim 20, wherein the step (g) comprises the steps of:
(g-1) forming mask patterns on the air bearing surface of the slider portions second row through the first mask; and
(g-2) milling the air bearing surface of the second row through the mask patterns to form the first type elements.

23. A method according to claim 20, wherein the step (h) comprises the steps of:
(h-1) forming mask patterns on the air bearing surface of the fourth slider portions through the second mask; and
(h-2) milling the air bearing surface through the mask patterns to form the second type elements.

24. A method according to claim 16, further comprising the steps of:
(j) after the step (i), forming a first pattern on the air bearing surface of a third slider portion; and
(k) after the step (j), forming a first pattern on the air bearing surface of a fourth slider portion.

25. A method according to claim 16, wherein the step (h) comprises the steps of:
(h-1) selecting a second mask different from the first mask from a plurality of masks;
(h-2) forming a mask pattern on the air bearing surface of the third slider portion through the second mask; and
(h-3) milling the air bearing surface through the mask pattern to form the second type elements.

26. A method according to claim 25, wherein the step (i-3) is performed with laser beam.

27. A method according to claim 24, further comprising the steps of:
(l) after the step (k), forming the second pattern on the air bearing surface of the third slider portion; and
(k) after the step (l), forming the second pattern on the air bearing surface of the fourth slider portion.

28. A method according to claim 16, wherein the substrate comprises $Al_2O_3$—TiC.

29. A method according to claim 16, wherein the first and second patterns are substantially the same.

30. A method according to claim 16, wherein the first and second patterns are different.

31. A method according to claim 16, wherein the first and second patterns are asymmetric with respect to a center line of each slider portion.

32. A method for manufacturing a magnetic head assembly having a magnetic transducer and a slider, comprising of the steps of:
(a) forming a plurality of magnetic transducers on slider portions in a substrate, the substrate having an air bearing surface (ABS) to be opposed to a surface of a magnetic medium;
(b) testing each of said magnetic transducers to determine which transducers are good and which are failed;

(c) forming a plurality of asymmetrical patterns with respect to a center axis of the slider portion, in the ABS, comprising the steps of:
(b-1) selecting a first mask from a plurality of masks;
(b-2) forming a first one of the asymmetrical patterns on the ABS through the first mask;
(b-3) selecting a second mask different from the first mask from a plurality of masks;
(b-4) forming a second one of the asymmetrical patterns on the ABS through the second mask; and (d) determining the asymmetrical patterns based on the results of the testing.

33. A method according to claim 32, wherein the steps (c-2) and (c-4) are performed with laser beam.

34. A method according to claim 32, wherein the slider comprises $Al_2O_3$—TiC.

* * * * *